United States Patent
Imao

(10) Patent No.: US 9,596,093 B2
(45) Date of Patent: Mar. 14, 2017

(54) COMMUNICATION APPARATUS, CONTROL METHOD FOR COMMUNICATION APPARATUS, AND RECORDING MEDIUM

(71) Applicant: CANON KABUSHIKI KAISHA, Tokyo (JP)

(72) Inventor: Eiji Imao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 13/921,979

(22) Filed: Jun. 19, 2013

(65) Prior Publication Data

US 2013/0346769 A1  Dec. 26, 2013

(30) Foreign Application Priority Data

Jun. 20, 2012  (JP) ................................ 2012-138386

(51) Int. Cl.
G06F 1/32 (2006.01)
H04L 12/12 (2006.01)

(52) U.S. Cl.
CPC ............ *H04L 12/12* (2013.01); *G06F 1/3209* (2013.01); *G06F 1/3278* (2013.01); *Y02B 60/126* (2013.01); *Y02B 60/34* (2013.01)

(58) Field of Classification Search
CPC .................................................... G06F 1/3209
See application file for complete search history.

(56) References Cited

U.S. PATENT DOCUMENTS

| 6,438,383 | B1* | 8/2002 | Hall et al. ...................... 455/458 |
| 6,470,393 | B1* | 10/2002 | Heinrich ................. H04L 12/12 709/238 |
| 2003/0068024 | A1* | 4/2003 | Jones et al. .............. 379/102.04 |
| 2007/0162777 | A1 | 7/2007 | Imao |
| 2012/0079302 | A1 | 3/2012 | Ise |

FOREIGN PATENT DOCUMENTS

| CN | 101813970 A | 8/2010 |
| CN | 102419628 A | 4/2012 |
| JP | 2004-164566 A | 6/2004 |
| JP | 2006-254117 A | 9/2006 |

* cited by examiner

*Primary Examiner* — Kim Huynh
*Assistant Examiner* — Eric Chang
(74) *Attorney, Agent, or Firm* — Canon U.S.A., Inc. IP Division

(57) ABSTRACT

A communication apparatus having a first state and a second state having different power consumptions receives a communication start request from another communication apparatus when the communication apparatus is in the first state, shifts a state of the communication apparatus to the second state having power consumption which is larger than that of the first state, in response to the reception of the communication start request, and transmits a response to the communication start request to the another communication apparatus if the communication setting used for the communication with the another communication apparatus is not changed after shifting to the second state, and does not transmit a response indicating that the communication in accordance with the communication start request is available to the another communication apparatus if the communication setting is changed.

13 Claims, 10 Drawing Sheets

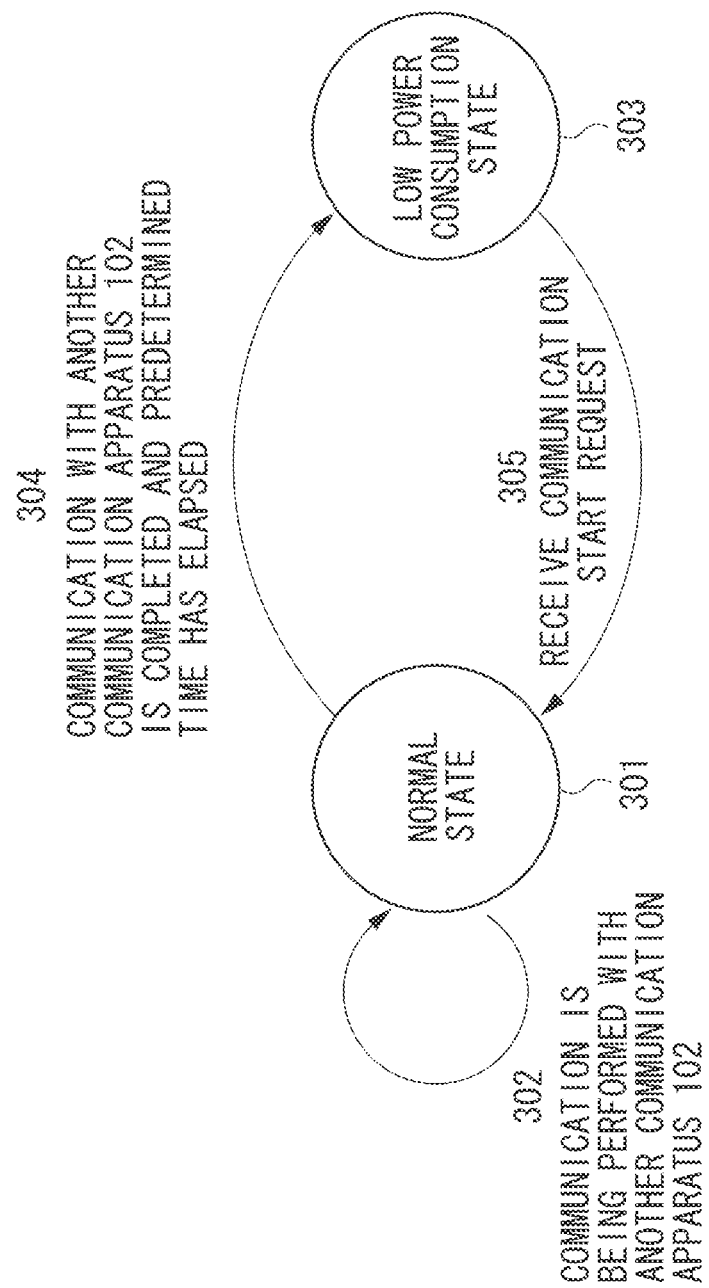

COMMUNICATION APPARATUS, CONTROL METHOD FOR COMMUNICATION APPARATUS, AND RECORDING MEDIUM

BACKGROUND OF THE INVENTION

Field of the Invention

The present invention relates to an apparatus which receives a request for starting communication from another apparatus.

Description of the Related Art

Some printers or projectors include a processing unit which performs print processing or projection processing, and a communication unit which communicates with another communication apparatus. In such a printer or projector (hereinafter, referred to as a communication apparatus), there is a technology in which the processing unit is turned off while the communication unit is turned on so as to be in a power saving state in order to reduce power consumption of the communication apparatus.

In such a communication apparatus, if the communication apparatus receives a request packet for starting communication from another communication apparatus in a power saving state, the communication apparatus transmits a response to the request packet for starting communication to start communication, and both of the processing unit and the communication unit shift to a normal state where the power is on (US Unexamined Publication No. 2007/0162777). The request packet for starting communication refers to, for example, a synchronize (SYN) packet in a transmission control protocol (TCP). Further, if the processing unit shifts from a power-off state to a power-on state, the processing unit performs initialization.

When the communication apparatus shifts from a power saving state to a normal state and the processing unit performs initialization, a communication setting such as an address of the communication apparatus is changed in some cases. If the communication setting has been changed, the communication apparatus cannot communicate with another communication apparatus using the communication setting before the change.

Therefore, there is a problem that, if the communication apparatus transmits a response to a request packet for starting communication which was received in a power saving state even though the communication setting has been changed, the requesting communication apparatus may erroneously recognize that it may communicate with the responding communication apparatus using the communication setting before the change.

SUMMARY OF THE INVENTION

The present invention is directed to a communication apparatus.

According to an aspect to of the present invention, a communication apparatus having a first state and a second state having different power consumption includes a reception unit configured to receive a communication start request from another communication apparatus when the communication apparatus is in the first state, a shifting unit configured to shift a state of the communication apparatus to the second state having power consumption which is larger than that of the first state, in response to the reception of the communication start request by the reception unit, and a transmission unit configured to transmit a response to the communication start request to the another communication apparatus. If a communication setting used for communication with the another communication apparatus is changed after shifting to the second state by the shifting unit, the transmission unit does not transmit the response indicating that the communication in accordance with the communication start request is available to the another communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a state transition diagram.

DESCRIPTION OF THE EMBODIMENTS

Various exemplary embodiments, features, and aspects of the invention will be described in detail below with reference to the drawings.

Figure 1:
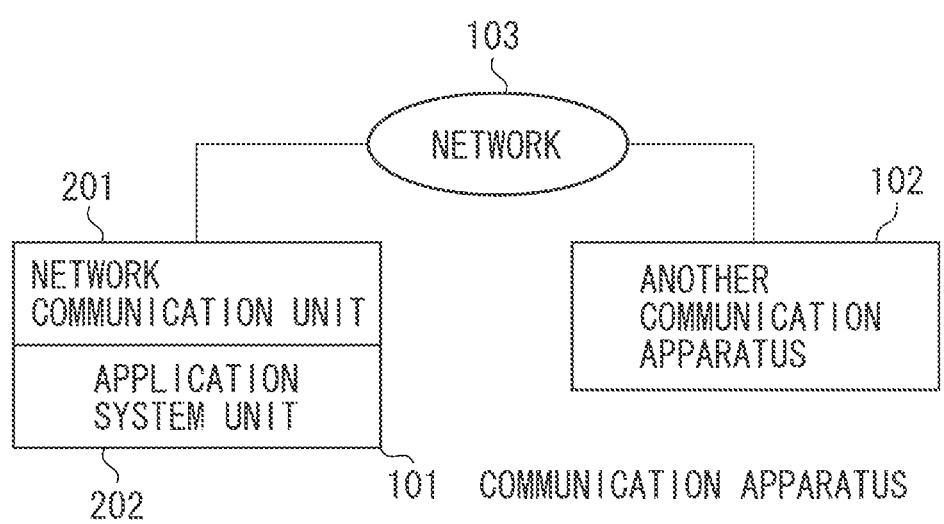
FIG. 1 is a diagram illustrating a network configuration.

FIG. 1 illustrates a network configuration of an exemplary embodiment of the present invention. A communication apparatus 101 and another communication apparatus 102 are connected through a network 103. In the exemplary embodiment, the network 103 is a local area network (LAN) or a wide area network (WAN) (such as Internet). The communication apparatus 101 and the another communication apparatus 102 perform a packet communication complying with a TCP/IP (Transmission Control Protocol/Internet Protocol).

Figure 2A:
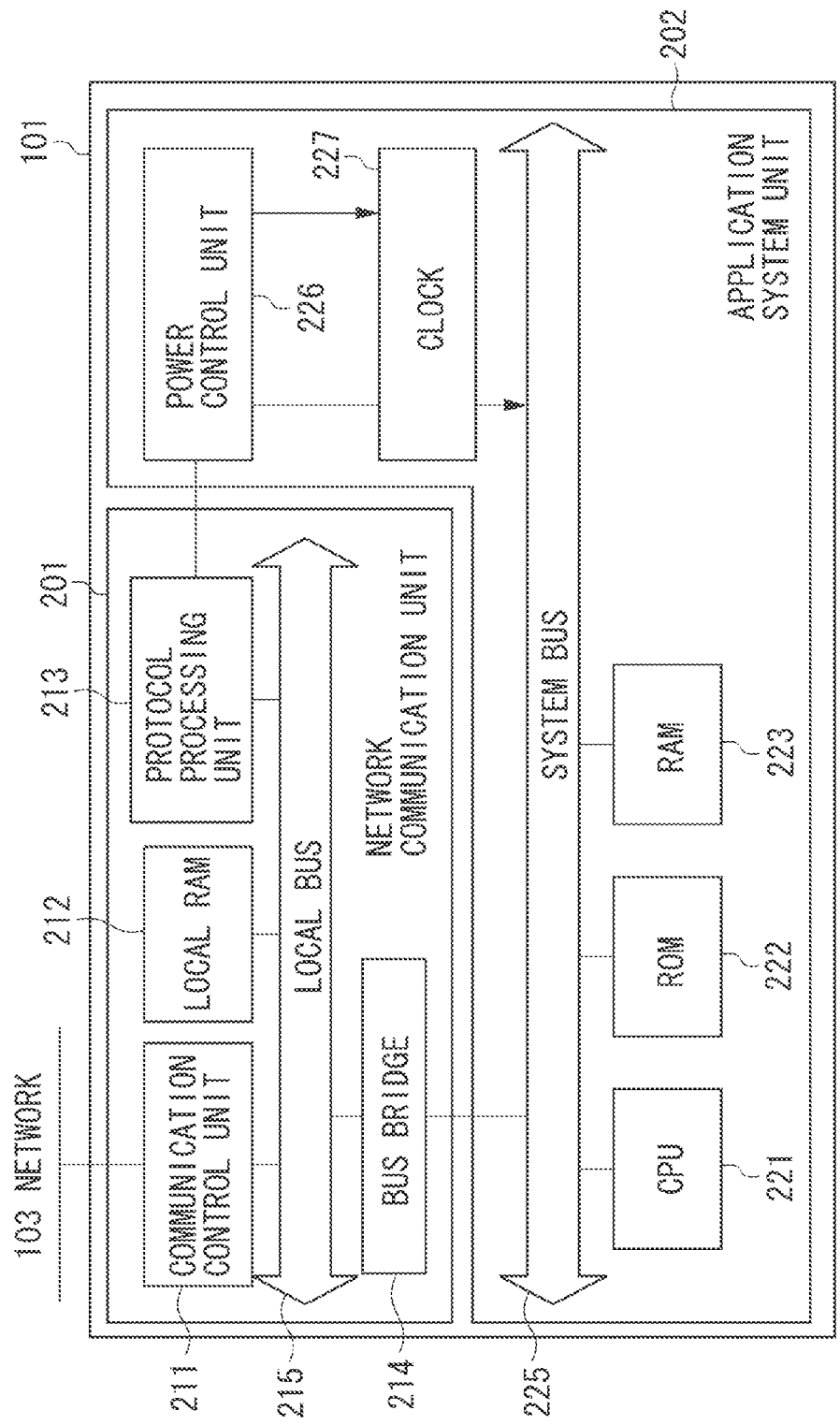
FIGS. 2A, 2B, and 2C are hardware configuration diagrams.

FIG. 2A illustrates a hardware configuration of the communication apparatus 101. The communication apparatus 101 includes a network communication unit 201 and an application system unit 202.

The network communication unit 201 performs communication with the another communication apparatus 102 through the network 103. The application system unit 202 controls the network communication unit 201 to output data received from the another communication apparatus 102. Here, output refers to print, display, or projection.

The network communication unit 201 includes a communication control unit 211, a local RAM 212, a protocol processing unit 213, and a bus bridge 214. These hardware modules are connected by a local bus 215.

The communication control unit 211 transmits/receives a packet complying with the TCP/IP to/from the another communication apparatus 102 through the network. The local RAM 212 temporarily stores (buffers) data (transmitting data or receiving data) required for the communication control unit 211 to perform the transmission/reception of the packet. The protocol processing unit 213 performs various types of protocol processing for performing communication complying with the TCP/IP. For example, the protocol processing unit 213 performs header analysis of a received packet, transmitting flow control, congestion control, or communication error control. Further, the protocol processing unit 213 also controls a power control unit 226, which will be described below.

The application system unit 202 includes a central processing unit (CPU) 221, a read-only memory (ROM) 222, a random access memory (RAM) 223, and a clock 227. These hardware modules are connected by a system bus 225.

The CPU 221 reads out and executes a program stored in the ROM 222 to control the application system unit 202 to print or display data. Further, the RAM 223 is used as a work memory when the CPU 221 reads out and executes the program.

The application system unit 202 further includes the power control unit 226. The power control unit 226 performs power control or reset processing on various hardware modules of the application system unit 202. Further, the power control unit 226 operates in accordance with an instruction from the protocol processing unit 213.

A state where power is supplied to various hardware modules in the application system unit 202 by the power control unit 226 is referred to as a normal state. In the normal state, the communication apparatus 101 receives data from the another communication apparatus 102, and can print or display the data.

In contrast, a state where power is not supplied to the various hardware modules in the application system unit 202 by the power control unit 226 is referred to as a low power consumption state. As compared with the normal state, in the low power consumption state, the power consumption of the communication apparatus 101 is reduced. In the low power consumption state, the communication apparatus 101 cannot print or display data received from the another communication apparatus 102. However, even in the low power consumption state, power is still supplied to the network communication unit 201 so that the communication apparatus 101 can receive a request for starting communication or an address resolution protocol (ARP) packet from the another communication apparatus 102 through the network 103. Here, the request for starting communication refers to a connection request packet of a TCP connection (TCP SYN packet).

If the communication apparatus 101 receives an ARP packet to its own IP address, the communication apparatus 101 notifies a media access control (MAC) address of the communication apparatus 101 to a partner apparatus which transmits the ARP packet.

The above-mentioned hardware modules 221 to 226 operate in accordance with a clock signal from the clock 227.

Figure 2B:
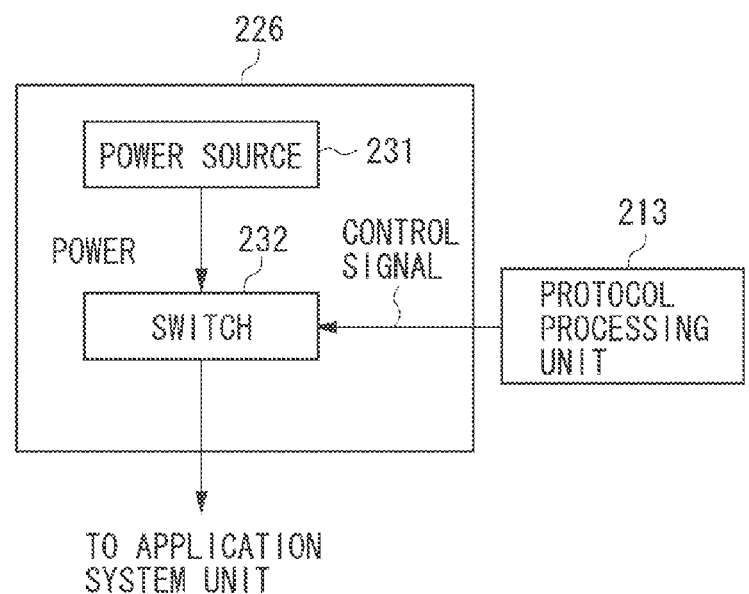

FIG. 2B illustrates details of the power control unit 226. A power source 231 is a power module which is connected to a commercial power source. The power source 231 may be a battery. A switch 232 switches whether to supply the power from the power source 231 to the application system unit 202 in accordance with a control signal from the protocol processing unit 213. The protocol processing unit 213 switches the switch 232 to control the power supply to the application system unit 202.

Figure 2C:
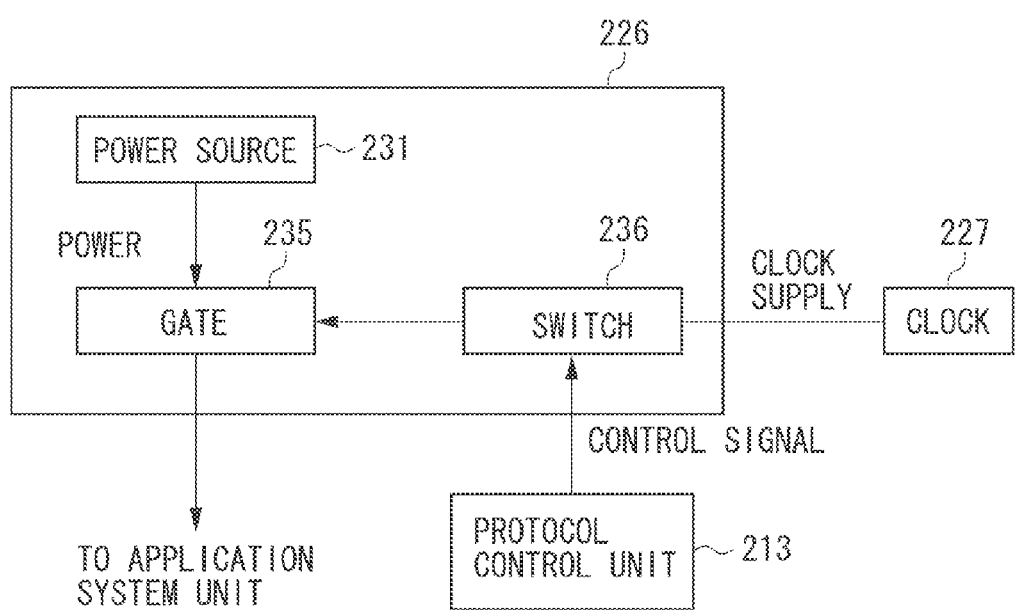

Further, instead of the configuration illustrated in FIG. 2B, a configuration illustrated in FIG. 2C may be adapted. That is, power is supplied from the power source 231 to the application system unit 202 through a gate 235. The power control unit 226 includes a switch 236 which switches whether to supply the clock supply from the clock 227 to the gate 235, and is configured to switch the turning on/off of the switch 236 in accordance with a control signal from the protocol processing unit 213. Here, the gate 235 operates in response to the clock supply from the clock 227 and is not electrically conducting if there is no clock supply. The same object may be achieved with this configuration.

FIG. 3 illustrates a state transition diagram between a plurality of states (a normal state and a low power consumption state). If the communication apparatus 101 is in a normal state (301), the normal state is maintained while the communication with another communication apparatus is continued (302). When a predetermined time has elapsed after completing communication with the another communication apparatus, the normal state shifts (304) to the low power consumption state (303). Further, if the communication apparatus 101 is in the low power consumption state, when the communication apparatus 101 receives a request for starting communication from the another communication apparatus, the low power consumption state shifts (305) to the normal state.

In the present embodiment, programs which operate in the network communication unit 201 are different in the normal state (301) and the low power consumption state (303). A program which operates in the normal state performs general TCP/IP processing and exchanges data with the application system unit 202. In contrast, a program which operates in the low power consumption state does not exchange data with the application system unit 202 unless a predetermined request for starting communication (for example, a SYN packet of TCP) is received.

Figure 4:
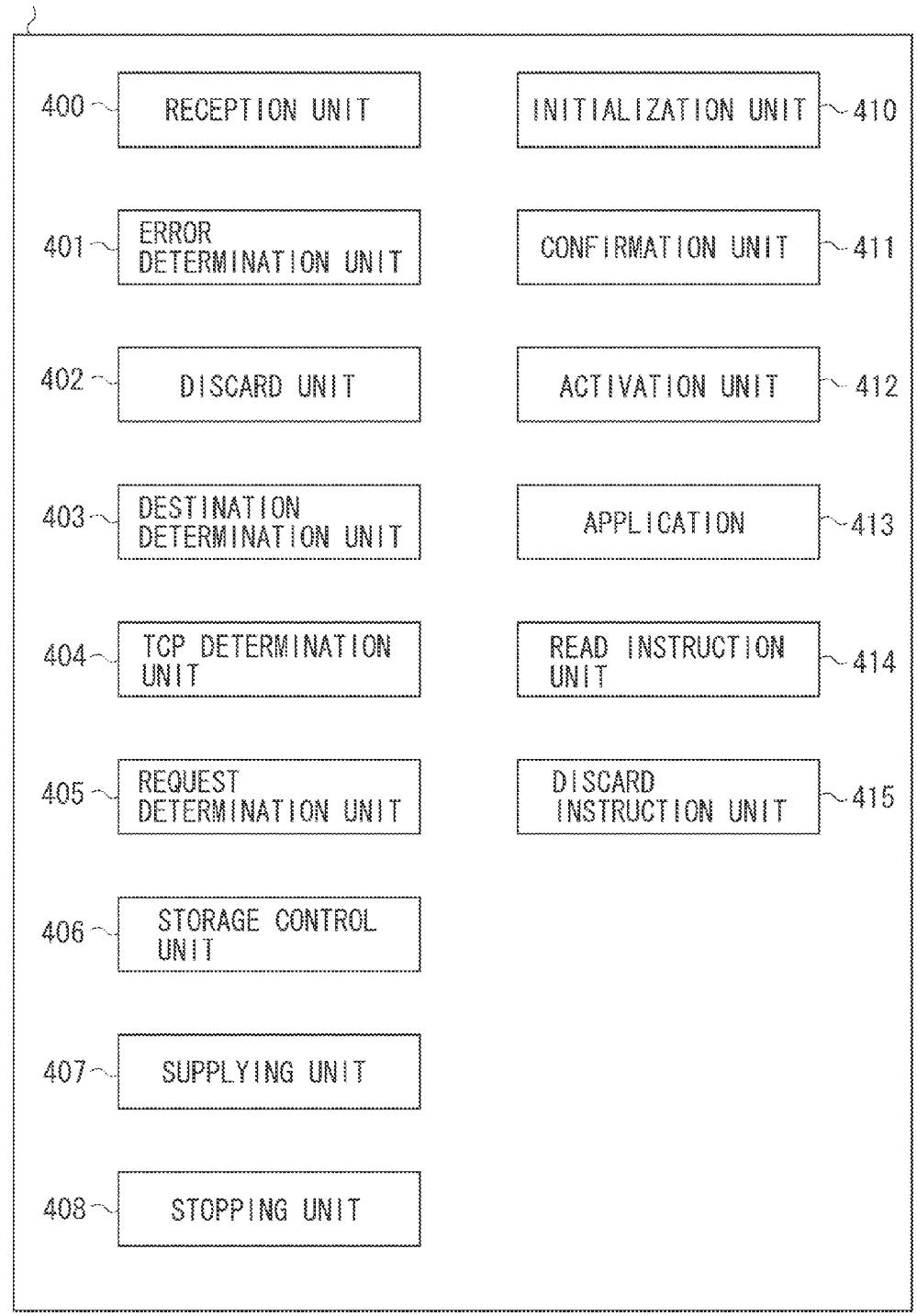
FIG. 4 is a software functional block diagram.

FIG. 4 illustrates a software configuration of the communication apparatus 101. Each of the software modules illustrated in FIG. 4 is implemented when the CPU 221 reads out and executes a program stored in the ROM 222 or the communication control unit 211 or the protocol processing unit 213 operates.

A reception unit 400 receives an IP packet. An error determination unit 401 determines whether there is an error in the received IP packet. A discard unit 402 discards the IP packet received by the reception unit 400. A destination determination unit 403 determines whether a destination of the IP packet is the communication apparatus 101 based on the IP address which is the destination of the IP packet. A TCP determination unit 404 determines whether a data unit of the IP packet is data (TCP packet) complying with the TCP.

A request determination unit 405 determines whether the received TCP packet is a request for starting communication. A storage control unit 406 stores the IP packet received by the reception unit 400 in the local RAM 212. A supplying unit 407 instructs the power control unit 226 to supply power to the various hardware modules in the application system unit 202. A stopping unit 408 stops the reception of the IP packet by the reception unit 400.

An initialization unit 410 initializes the application system unit 202. A confirmation unit 411 confirms that the request for starting communication is stored in the local RAM 212. The confirmation unit 411 further confirms recovery status information stored in the local RAM 212. An activation unit 412 activates an application 413 specified by the recovery status information. The application 413 controls to display or print data which the communication apparatus 101 receives from the another communication apparatus 102. Further, the application 413 opens a port number which is used to communicate with the another communication apparatus 102. A read instruction unit 414 instructs the network communication unit 201 to read out the request for starting communication, which is stored in the RAM 212. A discard instruction unit 415 instructs to discard the request for starting communication stored in the local RAM 212.

Figure 5:
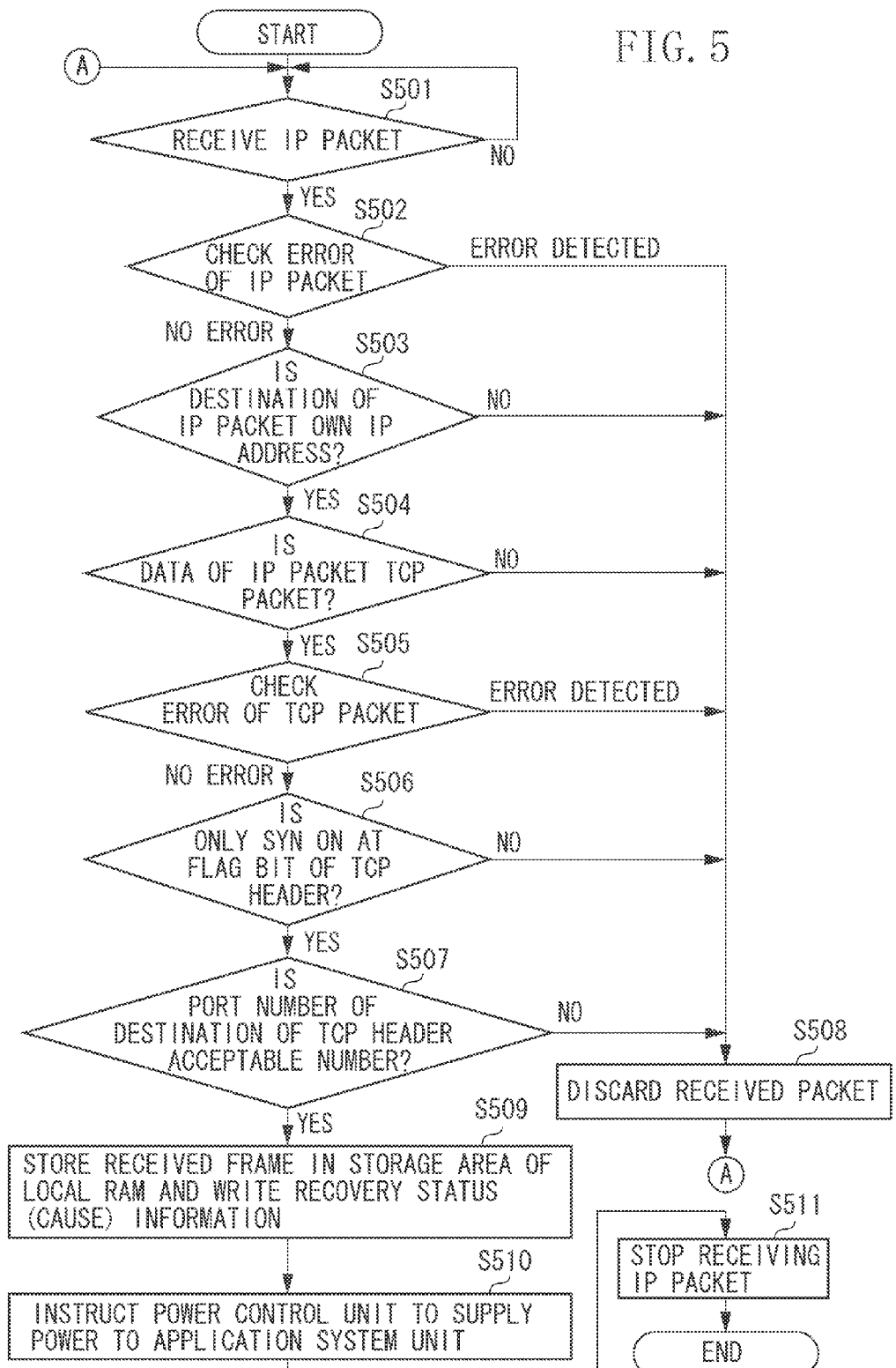
FIG. 5 is a flowchart of processing performed by a network communication unit.

FIG. 5 illustrates a flowchart of processing performed by the protocol processing unit 213 when the communication apparatus 101, which is in a low power consumption state, receives data (IP packet) complying with the IP from the another communication apparatus 102.

In step S501, the reception unit 400 receives an IP packet. When the IP packet is received, in step S502, the error determination unit 401 determines whether there is an error in the received IP packet. Specifically, it is checked whether information on a data length in a header (IP header) of the received IP packet matches with a data length of the IP packet which is actually received.

If the information on the data length in the IP header does not match the data length of the IP packet, it is determined that there is an error. Further, a value of a checksum of the IP header is calculated to check whether to match a value of a checksum which is written in the IP header. If the values of the checksums do not match each other, it is determined that there is an error. If it is determined that there is an error, the processing proceeds to step S508 and the discard unit 402 discards the received IP packet. In contrast, if it is determined that there is no error, the processing proceeds to step S503.

In step S503, the destination determination unit 403 determines whether the destination of the IP packet is the communication apparatus 101. Specifically, it is checked whether an IP address which is set in the communication apparatus 101 matches with an IP address which is a destination of the IP packet. If the IP addresses match each other, it is determined that the destination of the IP packet is the communication apparatus 101. If it is determined that the destination of the IP packet is not the communication apparatus 101, the processing proceeds to step S508 and the discard unit 402 discards the received IP packet. In contrast, if it is determined that the destination of the IP packet is the communication apparatus 101, the processing proceeds to step S504.

In step S504, the TCP determination unit 404 determines whether a data unit of the IP packet is data (TCP packet) complying with the TCP. If it is determined that the data unit is not a TCP packet, the processing proceeds to step S508 and the discard unit 402 discards the received IP packet. In contrast, if it is determined that the data unit is the TCP packet, the processing proceeds to step S505.

In step S505, the error determination unit 401 determines whether there is an error in the TCP packet. Specifically, the value of the checksum of the header (TCP header) of the TCP packet is calculated to check whether it matches the value of the checksum written in the TCP header. If the values of the checksums do not match each other, it is determined that there is an error. If it is determined that there is an error, the processing proceeds to step S508 and the discard unit 402 discards the received IP packet. In contrast, if it is determined that there is no error, the processing proceeds to step S506.

In step S506, the request determination unit 405 determines whether the received TCP packet is a request for starting communication. Specifically, if an urgent (URG) flag, an acknowledgement (ACK) flag, a push (PSH) flag, a reset (RST) flag, and a finished (FIN) flag in the TCP packet are off, but only a synchronize (SYN) flag is on, it is determined that the TCP packet is the request for starting communication (a SYN packet of the TCP). The FIN flag means that there is no more data from a sender. If it is determined that the TCP packet is not the request for starting communication, the processing proceeds to step S508 and the discard unit 402 discards the received IP packet. In contrast, if it is determined that the TCP packet is the request for starting communication, the processing proceeds to step S507.

In step S507, the destination determination unit 403 determines whether a port number of the destination of the TCP packet is an acceptable port number. If the port number of the destination is not an acceptable port number, the processing proceeds to step S508 and the discard unit 402 discards the received IP packet. In contrast, if the port number of the destination is an acceptable port number, the processing proceeds to step S509.

In step S509, the storage control unit 406 stores the received IP packet in the local RAM 212. Further, the storage control unit 406 stores the recovery status information in the local RAM 212. The recovery status information includes information on the received IP packet (for example, a reception time or a length of a packet) or information specifying an application which communicates with the another communication apparatus 102 (for example, a type of protocol or a port number).

In step S510, the supplying unit 407 instructs the power control unit 226 to supply a power to the various hardware modules in the application system unit 202. By doing this, the low power consumption state shifts to the normal state. Further, in step S511, the stopping unit 408 stops the reception of the IP packet by the reception unit 400. In other words, in order to switch from a program which operates in the low power consumption state of the network communication unit 201 to a program which operates in the normal state, the operation of the network communication unit 201 is temporarily stopped.

Figure 6:
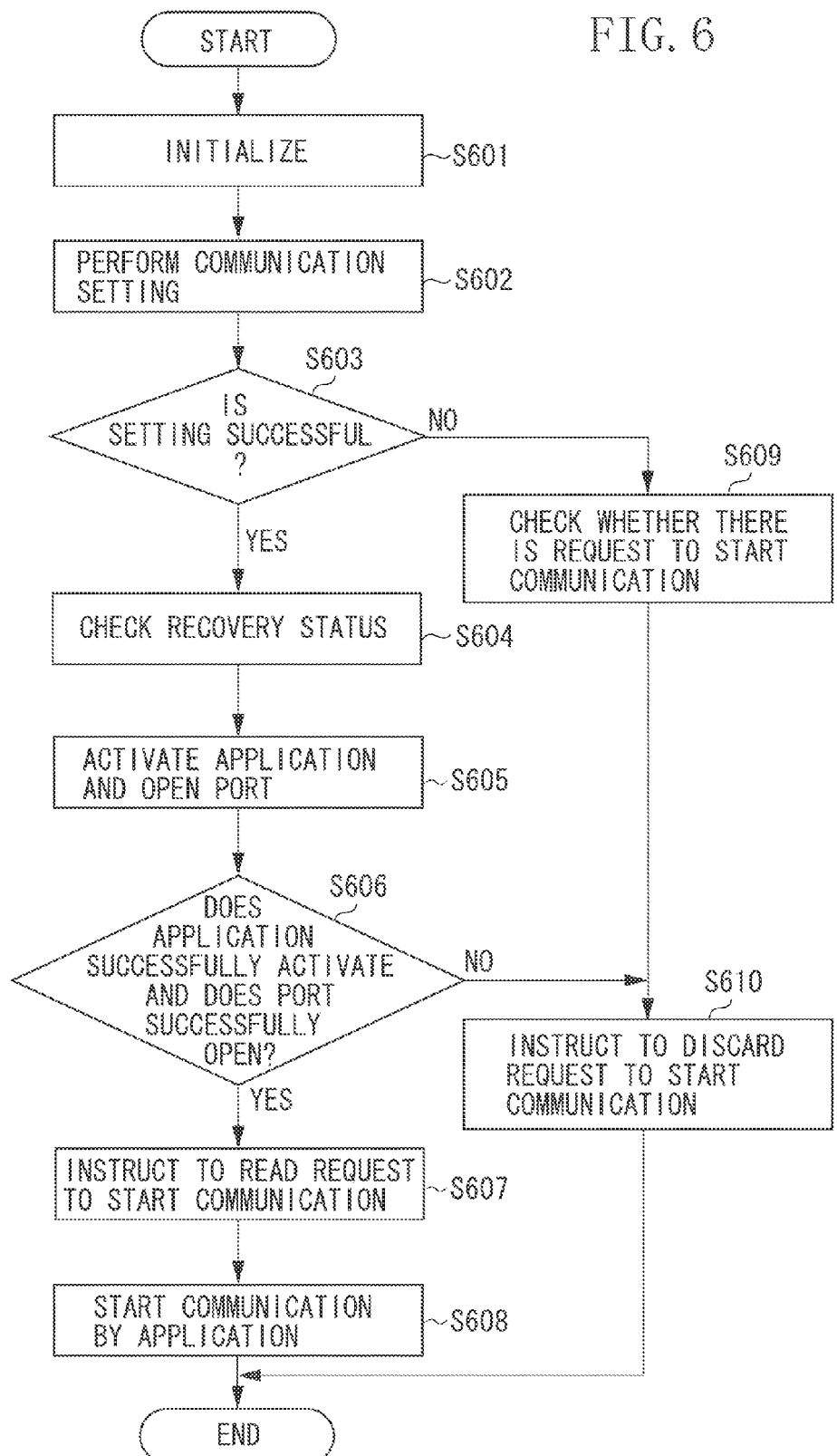
FIG. 6 is a flowchart of processing performed by an application system unit.
Figure 7:
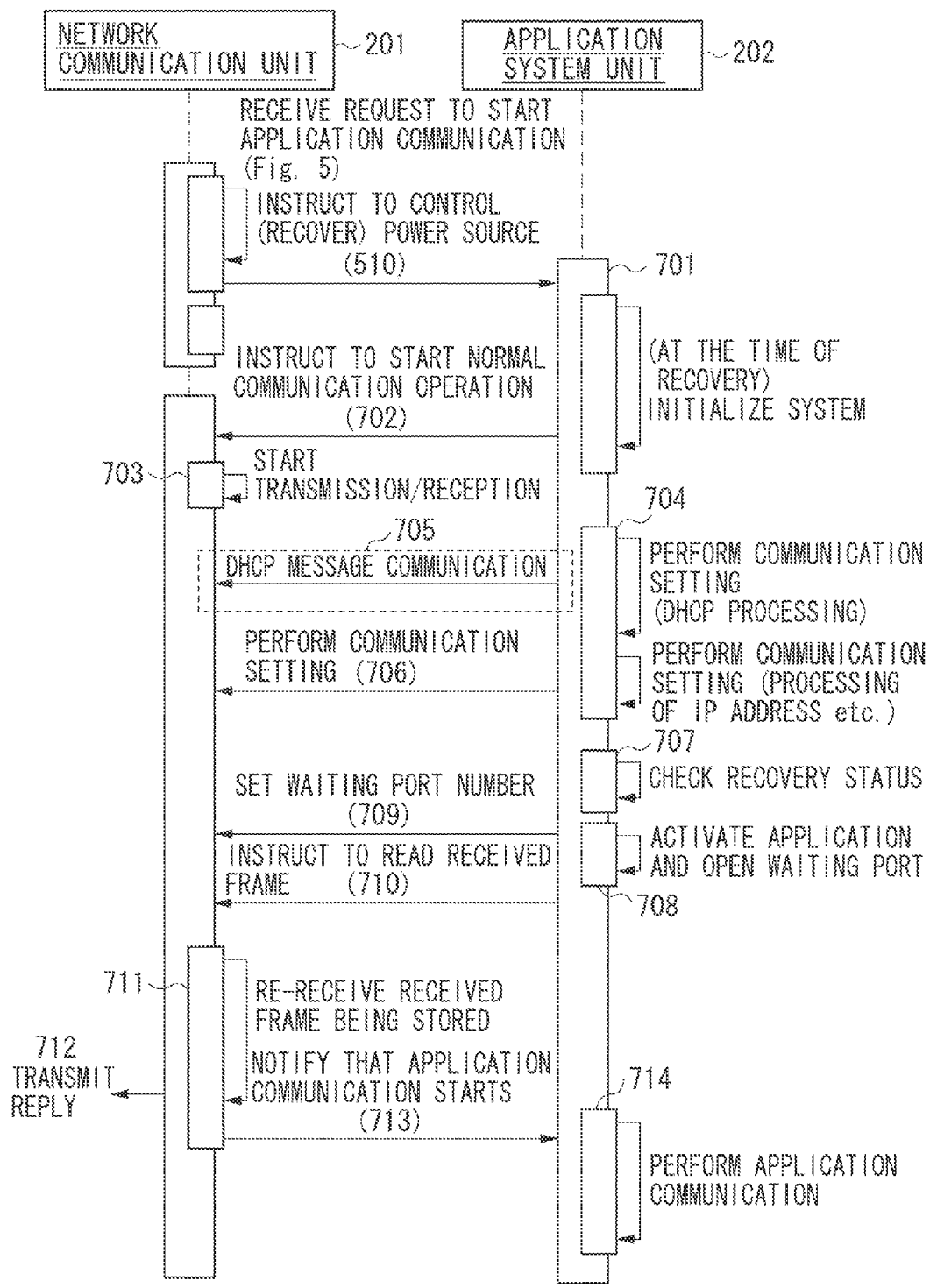
FIG. 7 is a sequence chart between the network communication unit and the application system unit.
Figure 8:
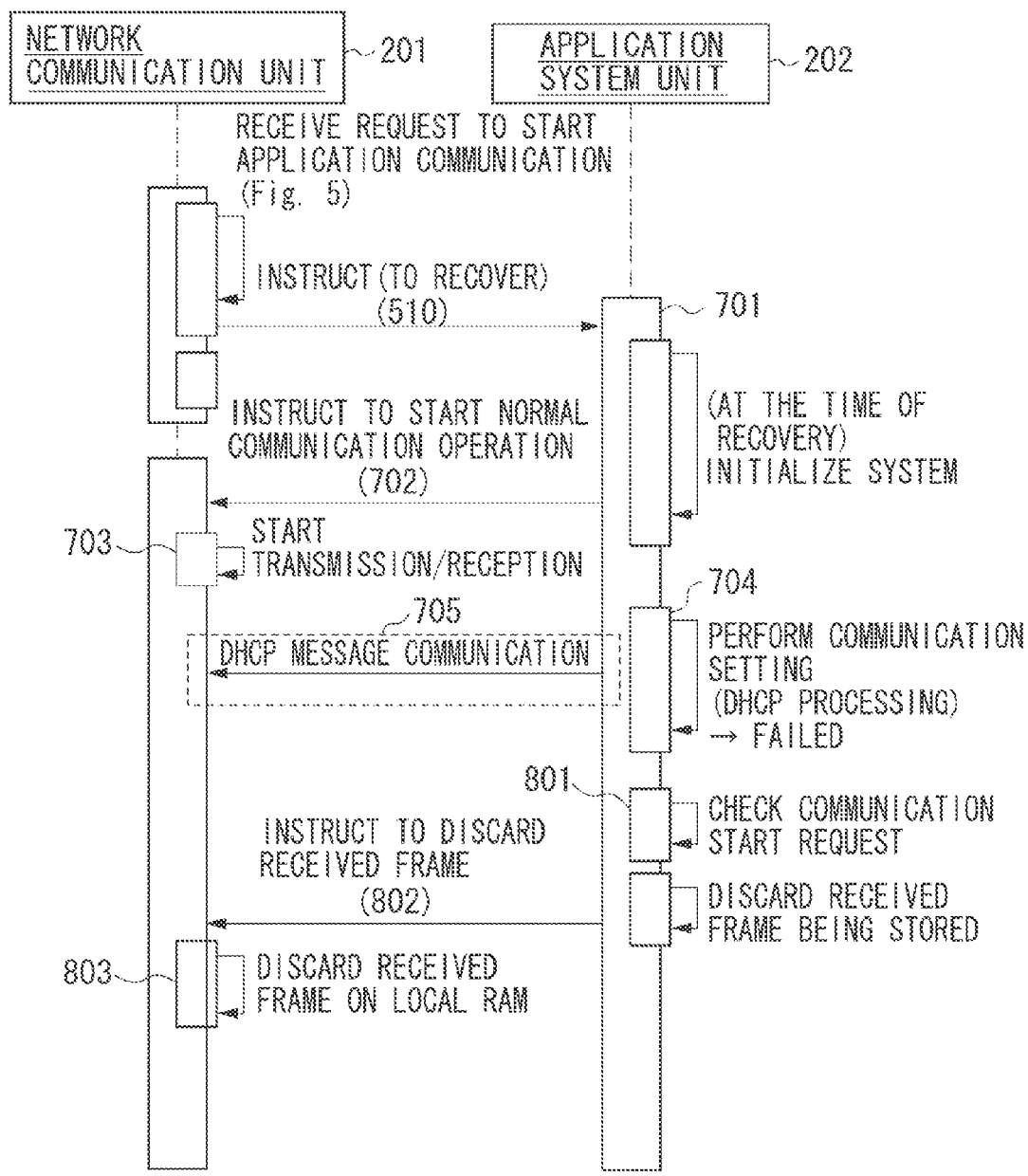
FIG. 8 is a sequence chart between the network communication unit and the application system unit.
Figure 9:
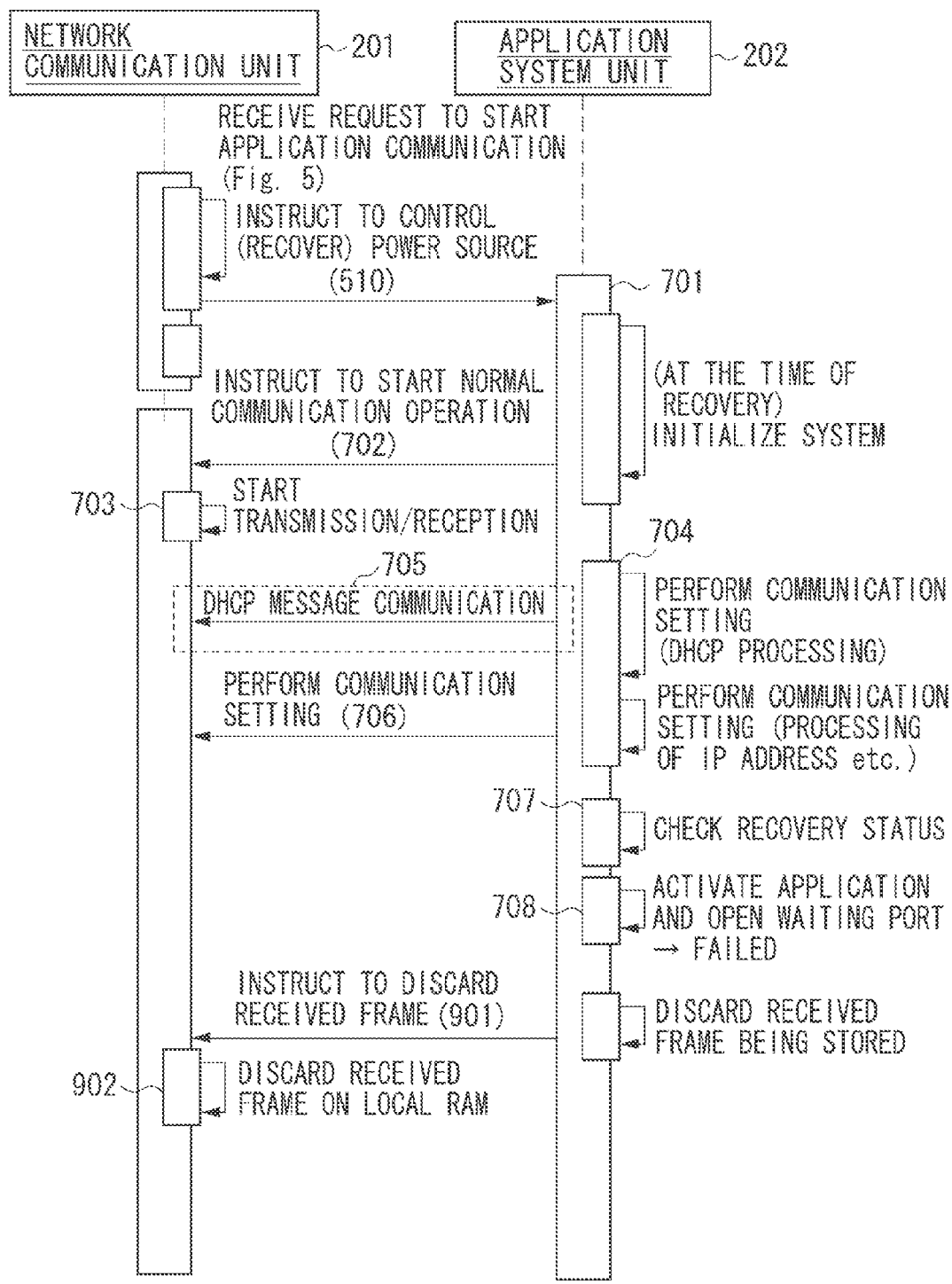
FIG. 9 is a sequence chart between the network communication unit and the application system unit.

FIG. 6 illustrates a flowchart of processing performed by the CPU 221 reading out the program stored in the ROM 222 after supplying power to the application system unit 202. Further, FIGS. 7 to 9 illustrate a sequence chart between the application system unit 202 and the network communication unit 201 after supplying power to the application system unit 202.

When the power is supplied to the application system unit 202, the initialization unit 410 initializes the application system unit 202 (steps S601, 701, and 702). In the initialization processing, initial settings of the hardware in the system and the system software are performed. Further, the initialization unit 410 instructs the network communication unit 201 to start the operation in the normal state.

When the network communication unit 201 receives the instruction to start the operation, a program which operates in the normal state in the protocol processing unit 213 is executed to start communication of the IP packet (703). However, at this time, a communication setting such as an IP address is in an invalidated state so that the IP packet received from the network 103 by the reception unit 400 is discarded by the discard unit 402.

Then, the application system unit 202 performs the communication setting (steps S602, 704, 705, and 706). Specifically, the application system unit 202 communicates with a Dynamic Host Configuration Protocol (DHCP) server through the network communication unit 201 to acquire an IP address.

In the communication, it is instructed to transmit a DHCP message (for example, to transmit a DHCP discover message, or a DHCP request message) between the application system unit 202 and the network communication unit 201. Further, notification of reception of the DHCP message (reception of a DHCP offer message or DHCP acknowledgement (Ack) message) is exchanged from the network communication unit 201 to the application system unit 202. The application system unit 202 sets the IP address acquired by the communication with the DHCP server in the network communication unit 201.

First, a case when the communication setting fails will be described (No in step S603). For example, if an operation of the DHCP server stops, the DHCP message cannot be received so that the communication setting is set to fail. When the communication setting is set to fail, the confirmation unit 411 confirms that the request for starting communication is stored in the local RAM 212 (steps S609 and 801). The discard instruction unit 415 instructs the network communication unit 201 to discard the request for starting communication stored in the local RAM 212 (steps S610, 802) and the discard unit 402 discards the request for starting communication in accordance with the instruction (803).

Therefore, it is possible to prevent a response to the request for starting communication from being transmitted in the case that the application communication is not available. Here, the response refers to a response indicating that the communication in accordance with the request for starting communication (for example, communication using an address when the request for starting communication is received) is available, and includes an Ack (an affirmative response) for the request for starting communication.

Next, a case when the communication setting succeeds will be described (Yes in step S603). If the communication setting succeeds (Yes in step S603), the confirmation unit 411 checks recovery status information stored in the local RAM 212 (steps S604, 707). As described above, the recovery status information includes information specifying the application which is requested to start the application communication (for example, a type of protocol or a reception port number). The activation unit 412 activates the application 413 specified by the recovery status information (steps S605, 708). The activated application 413 opens a port number which is used for the communication (steps S605, 709).

Here, if the activation of the application or the opening of the port number fails (No in step S606), the discard instruction unit 415 instructs the network communication unit 201 to discard the request for starting communication stored in the local RAM 212 (steps S610, 901). The discard unit 402 discards the request for starting communication in accordance with the instruction (902). By doing this, it is possible to prevent a response to the request for starting communication from being transmitted in the case that application communication is not available.

In the meantime, if the application 413 is successfully activated and the port number is successfully opened (Yes in step S606), the read instruction unit 414 instructs the network communication unit 201 to read the request for starting communication stored in the RAM 212 (steps S607, 710). That is, it is instructed to the program which operates in the normal state in the network communication unit 201 to read the request for starting communication stored in the RAM 212 to perform the reception processing again. If the program which operates in the network communication unit 201 receives the instruction, the program performs the operations of steps S502 to S508 illustrated in FIG. 5 again (711, re-reception processing).

If the communication setting performed in step S602 is the same as the communication setting in the low power consumption state (that is, the same IP address as in the low power consumption state is acquired by the DHCP communication), the TCP connection of application communication is established by the re-reception processing. In other words, the network communication unit 201 transmits the response to the request for starting communication (712). The network communication unit 201 notifies the application 413 that the application communication has started (713) and the application communication is performed (714).

However, for example, in step S602, if the IP address which is different from that in the low power consumption state is acquired (that is, the communication setting is changed), it is determined that the request for starting communication is not for its own apparatus by the re-reception processing. In accordance with the determination result, the request for starting communication is discarded (No in step S503). Therefore, the application communication does not start. Further, even though the communication setting performed in step S602 is the same as the communication setting in the low power consumption state, if the application is not normally activated or the opening of the port fails (No in step S606), the request for starting communication is discarded. By doing this, it is possible to prevent a response to the request for starting communication from being transmitted in the case that the application communication is not available.

In this case, even though the another communication apparatus 102 transmits the request for starting communication, the another communication apparatus 102 cannot receive the response to the request. Therefore, the another communication apparatus 102 searches for an apparatus having a predetermined function (for example, a printing function or a display/projecting function) in the network 103. For example, the another communication apparatus 102 transmits a discovery signal defined in a Universal Plug and Play (UPnP). The discovery signal is broadcasted in the network 103.

If the network communication unit 201 of the communication apparatus 101 receives the discovery signal and the communication apparatus 101 has a predetermined function for which the another communication apparatus 102 searches, the network communication unit 201 transmits a response to the discovery signal to the another communication apparatus 102. The response includes the IP address of the communication apparatus 101. This IP address is an IP address which is acquired during the initialization processing after activating the application system unit 202.

By doing this, the another communication apparatus 102 may acquire the IP address of the communication apparatus 101. Therefore, the another communication apparatus 102 transmits the request for starting the communication to the communication apparatus 101 using the acquired IP address again. The network communication unit 201 of the communication apparatus 101 which has received the request for starting communication transmits a response to the request for starting communication (corresponding to 712 of FIG. 7) and notifies the application system unit 202 of the starting of the application communication (corresponding to 714 of FIG. 7). By doing this, the communication apparatus 101 and the another communication apparatus 102 can resume the IP communication.

Further, the operation is not limited thereto, but the following operation may be performed. The network communication unit 201 or the application system unit 202 determines that the IP address is changed by the communication setting of the application system unit 202. If it is determined that the IP address is changed, the network communication unit 201 may notify the IP address to the another communication apparatus 102. Even by doing this, the another communication apparatus 102 may transmit the request for starting communication using the changed IP address, so that the communication apparatus 101 and the another communication apparatus 102 may resume IP communication.

In the present invention, in response to the reception of the request for starting communication from the another communication apparatus 102, a first state (for example, the low power consumption state) shifts to a second state (for example, the normal state). Before and after shifting, it is determined whether the communication setting (for example, the IP address) used for communication with the another communication apparatus 102 is changed. The determination may be performed by comparing the IP address written in the request for starting communication received as described above with the IP address set in the communication apparatus 101 after shifting to the second state.

However, the present invention is not limited thereto, but the protocol processing unit 213 may store the IP address at the time of the first state, and the stored IP address may be compared with the IP address which is set in the communication apparatus 101 after shifting to the second state to perform the determination. In accordance with the determination result, the communication apparatus 101 transmits the response to the request for starting communication from the another communication apparatus 102.

Specifically, if the communication setting is not changed, the communication apparatus 101 transmits the response to the request for starting communication. In contrast, if the communication setting is changed, the communication apparatus 101 does not transmit the response to the request for starting communication. By doing this, it is possible to prevent the response to the request for starting communication from being transmitted in the case that the application communication is not available.

Further, according to one of the other aspects of the present invention, if the communication apparatus 101 does not transmit the response to the request for starting communication transmitted to the another communication apparatus 102, the communication apparatus 101 notifies the changed communication setting (IP address) to the another communication apparatus 102. By doing this, the another communication apparatus may know the changed communication setting (IP address) and the communication apparatus 101 and the another communication apparatus 102 may start the application communication.

Furthermore, according to another aspect of the present invention, the request for starting communication includes information for specifying an application which is a communication partner. Therefore, the another communication apparatus 102 may designate an application to be activated in the communication apparatus 101 and communication intended by a user may be performed.

In the exemplary embodiment described above, instead of discarding the request for starting communication, the communication apparatus 101 may notify the another communication apparatus 102 that the communication in accordance with the request for starting communication (for example, communication using an address when the request for starting communication has been received) cannot start. That is, a denial response to the request for starting communication may be transmitted. Even by doing this, the another communication apparatus is less likely to erroneously recognize that communication is available in this communication setting.

Further, the changed communication setting may be included in the denial response. By doing this, the another communication apparatus can know the changed communication setting (IP address) and the communication apparatus 101 and the another communication apparatus 102 can start application communication.

The present invention has one or a plurality of advantages as described above.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-138386 filed Jun. 20, 2012, which is hereby incorporated by reference herein in its entirety.

What is claimed is:

1. A communication apparatus comprising:
   a reception unit configured to receive a communication start request from another communication apparatus when the communication apparatus is in a first state;
   a check unit configured to check whether the communication start request received by the reception unit is addressed to the communication apparatus or not;
   a memory configured to store the communication start request received by the reception unit in a case where the communication start request is addressed to the communication apparatus;
   a shifting unit configured to shift a state of the communication apparatus to a second state having power consumption which is larger than that of the first state, in a case where the communication start request received by the reception unit is addressed to the communication apparatus;
   a setting unit configured to perform a communication setting for the communication apparatus in response to the state of the communication apparatus having been shifted to the second state by the shifting unit;

an instruction unit configured to instruct the check unit to recheck whether the communication start request stored by the memory is addressed to the communication apparatus or not in a case where the setting unit succeeds in the communication setting, and not to instruct the check unit to recheck whether the communication start request stored by the memory is addressed to the communication apparatus or not in a case where the setting unit fails in the communication setting; and a transmission unit configured to transmit a response to the communication start request to said another communication apparatus in a case where the check unit confirms that the communication start request stored by the memory is addressed to the communication apparatus again, and not to transmit a response to the communication start request to said another communication apparatus in a case where the check unit confirms that the communication start request stored by the memory is not addressed to the communication apparatus.

2. The communication apparatus according to claim 1, further comprising:

a notification unit configured to, if the transmission unit does not transmit the response to the communication start request to said another communication apparatus, notify the changed communication setting to the another communication apparatus.

3. The communication apparatus according to claim 1, the setting unit acquires an Internet Protocol (IP) address after shifting to the second state, and wherein, if an IP address which is a destination of the communication start request does not match the IP address acquired by the acquisition unit, the transmission unit does not transmit the response.

4. The communication apparatus according to claim 3, wherein the setting unit acquires the IP address in accordance with a Dynamic Host Configuration Protocol (DHCP).

5. The communication apparatus according to claim 1, further comprising:

a processing unit configured to print or project data; and a power source unit configured to control to supply a power to the processing unit, wherein, in the first state, the power source unit does not supply power to the processing unit, while in the second state, the power source unit supplies power to the processing unit.

6. The communication apparatus according to claim 5, wherein the power source unit supplies power to the processing unit in response to the reception of the communication start request.

7. The communication apparatus according to claim 5, further comprising:

a storing unit configured to store information for specifying an application to be activated in response to the reception of the communication start request by the reception unit, wherein the processing unit activates the application based on the information stored in the storing unit after receiving power by the power source unit to print or display data.

8. The communication apparatus according to claim 1, wherein, if the communication setting is changed, the transmission unit transmits a denial response to the communication start request.

9. The communication apparatus according to claim 1, wherein the communication start request is a synchronize (SYN) packet complying with a Transmission Control Protocol (TCP).

10. The communication apparatus according to claim 1, wherein the communication apparatus is a projector or a printer.

11. The communication apparatus according to claim 1, further comprising:

a discard unit configured to, in a case where the setting unit fails in the communication setting, discard the communication start request received by the reception unit when the communication apparatus is in the first state, while the transmission unit does not transmit the response to the communication start request.

12. A control method for a communication apparatus which has a checking unit, the method comprising:

receiving a communication start request from another communication apparatus when the communication apparatus is in a first state;

checking whether the communication start request received is addressed to the communication apparatus or not by the checking unit;

storing the communication start request received in a case where the communication start request is addressed to the communication apparatus;

shifting a state of the communication apparatus to a second state having power consumption which is larger than that of the first state, in a case where the communication start request received is addressed to the communication apparatus;

performing a communication setting for the communication apparatus in response to the state of the communication apparatus having been shifted to the second state;

instructing to recheck whether the stored communication start request is addressed to the communication apparatus or not in a case where succeeding in the communication setting, and not to recheck whether the communication start request is addressed to the communication apparatus or not in a case where failing in the communication setting; and transmitting a response to the communication start request to said another communication apparatus in a case where the check unit confirms that the stored communication start request is addressed to the communication apparatus again, and not to transmit a response to the communication start request to said another communication apparatus in a case where the check unit confirms that the communication start request is not addressed to the communication apparatus.

13. A non-transitory computer-readable storage medium storing a program for causing a computer to execute the control method for a communication apparatus which has a checking unit, the method comprising:

receiving a communication start request from another communication apparatus when the communication apparatus is in a first state;

checking whether the communication start request received is addressed to the communication apparatus or not by the checking unit;

storing the communication start request received in a case where the communication start request is addressed to the communication apparatus;

shifting a state of the communication apparatus to a second state having power consumption which is larger than that of the first state, in a case where the communication start request received is addressed to the communication apparatus;

performing a communication setting for the communication apparatus in response to the state of the communication apparatus having been shifted to the second state;

instructing to recheck whether the stored communication start request is addressed to the communication apparatus or not in a case where succeeding in the communication setting, and not to recheck whether the communication start request is addressed to the communication apparatus or not in a case where failing in the communication setting; and transmitting a response to the communication start request to said another communication apparatus in a case where the check unit confirms that the stored communication start request is addressed to the communication apparatus again, and not to transmit a response to the communication start request to said another communication apparatus in a case where the check unit confirms that the communication start request is not addressed to the communication apparatus.

\* \* \* \* \*